United States Patent [19]

Hirata et al.

[11] Patent Number: 4,675,355
[45] Date of Patent: Jun. 23, 1987

[54] RUBBER COMPOSITION

[75] Inventors: Yasushi Hirata, Saitama; Hitoshi Kondo, Tokyo; Shigemitsu Otomo, Tokyo; Hisahito Ueda, Tokyo, all of Japan

[73] Assignee: Bridgestone Corporation, Tokyo, Japan

[21] Appl. No.: 798,496

[22] Filed: Nov. 15, 1985

[30] Foreign Application Priority Data

Nov. 16, 1984 [JP] Japan .................................. 59-240928
Nov. 16, 1984 [JP] Japan .................................. 59-240932

[51] Int. Cl.$^4$ .......................... C08K 5/03; C08K 5/32; C08L 7/00; C08L 9/00
[52] U.S. Cl. .................................. 524/236; 524/260; 524/464; 524/495; 524/571; 524/575
[58] Field of Search ............... 524/571, 573, 574, 575, 524/464, 260, 236, 259; 525/359.6, 377

[56] References Cited

U.S. PATENT DOCUMENTS

| | | | |
|---|---|---|---|
| 3,367,904 | 2/1968 | Mullins et al. | 524/571 |
| 3,423,335 | 1/1969 | Phillips | 525/359.6 |
| 3,872,057 | 3/1975 | Pazos | 525/377 |
| 4,481,327 | 11/1984 | Ogawa et al. | 524/571 |

*Primary Examiner*—Allan M. Lieberman
*Attorney, Agent, or Firm*—Sughrue, Mion, Zinn, Macpeak, and Seas

[57] ABSTRACT

This invention relates to a novel rubber composition having improved green properties such as high green tensile strength and high green modulus and improved hysteresis loss and cut growth property, which comprises 100 parts by weight of a diene rubber, about 20 to about 00 parts by weight of a reinforcing filler, about 0.1 to about 3.0 parts by weight of a nitroso compound having the formula (I)

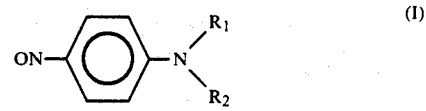

wherein $R_1$ and $R_2$, which may be the same or different, are selected from the group consisting of a hydrogen atom, an alkyl group having from 1 to 6 carbon atoms, a hydroxyalkyl group having from 1 to 6 carbon atoms, a cycloalkyl group and an aryl group and about 0.1 to about 3.0 parts by weight of an halogenated organic compound having the formula (II)

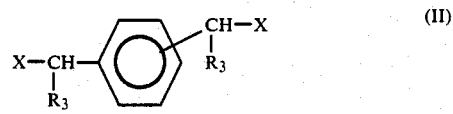

wherein $R_3$ is selected from the group consisting of a hydrogen atom, a methyl group, a chlorine atom and a bromine atom and X is a chlorine atom or a bromine atom.

14 Claims, 1 Drawing Figure

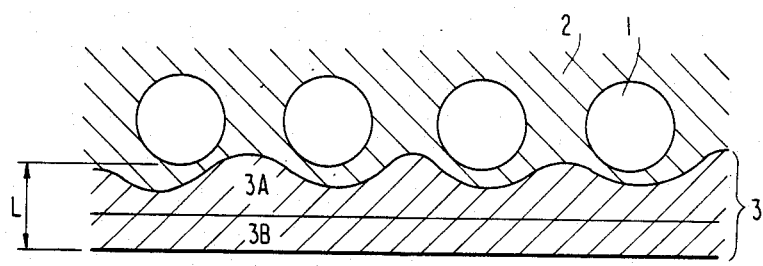

RUBBER COMPOSITION

FIELD OF THE INVENTION

The present invention relates to the manufacture of improved rubbery products for general use in rubber products of all kinds such as pneumatic tires, conveyer belts, hoses and damper devices. The primary use for the rubber products of the invention is in pneumatic tires for all types of land, sea and air vehicles. More particularly, the invention relates to preparing a rubber composition having not only improved green strength and modulus but also low hysteresis loss and improved cut growth property after vulcanization.

BACKGROUND OF THE INVENTION

It is very important to improve the green tensile strength and the green modulus of rubber used in rubber industries so as to manufacture products having accurate measurements according to their designs or improve processability. Therefore, improvement in the green properties of rubber compositions has been attempted.

Japanese Patent Application Laid Open No. 16,061/1980 discloses a rubber composition which comprises 100 parts by weight of natural rubber or a rubber blend consisting of at least 30 parts by weight of natural rubber and at most 70 parts by weight of a synthetic diene rubber and 0.1 to 1.0 parts by weight of a dinitroso compound to achieve accurate measurements of rubber products by protecting from flow rubber compositions which are placed adjacent to each other for example, as in producing a tire. The rubber composition has improved green properties, while hysteresis loss and cut growth property after vulcanization has not been improved.

U.S. Pat. No. 3,562,303 shows a process which comprises the steps of mixing a rubbery high-cis polymer or copolymer of isoprene with from about 0.1 to about 0.3 times by weight the amount of sulfur, and from about 0.1 to about 0.5 times by weight the amount of accelerator, masticating the mixture at temperatures on the order of 275°–350° F., cooling to temperatures below 220° F. and further compounding the mixture with additional quantities of sulfur sufficient to effect full vulcanization.

It has been proposed to provide epoxidized copolymers from 1,3-cyclodiene and acyclic conjugated diene monomers so as to improve green tensile strength, moduli, and oil resistance properties. Such epoxidized copolymers are described in U.S. Pat. No. 4,131,653.

Ionogene functional groups such as sodium acrylate, ammonium fumarate and calcium ethylpropenate are employed in the main chain of rubbery diene polymers or copolymers to achieve high green tensile strength, in Japanese Application Laid Open No. 155,652/1977.

Japanese Patent Publication Nos. 41,281/1983 and 41,282/1983 teach that tertiary amines are employed in the main chains of a butadiene-styrene copolymer or butadiene-acrylonitrile copolymer during the polymerization process and halogenated organic compound such as 4,4'-bis-bromomethyldiphenyl, 4,4'-bis-bromomethyldiphenylmethane, 4,4'-bis-bromomethyldiphenylether and 2,6-bis-bromomethylnaphthalene are added to polymerized lactices just after polymerization so as to improve green tensile strength.

U.S. Pat. No. 4,020,115 and U.S. Pat. No. 3,951,936 disclose rubbery homopolymers and copolymers exhibiting crystallinity on stretching uncompounded and uncured, a low vinyl content and a high trans-1,4 content so as to have high green tensile strength.

U.S. Pat. No. 3,868,344 suggests that improved green tensile strength can be obtained by controlling the molecular weights of the polymers.

Block polymers have been proposed to achieve high green strength. U.S. Pat. No. 4,152,370 proposes to provide a linear copolymer having the formula A-B/A'-C, wherein terminal block A is a block of poly(monovinylarene) and terminal block C is a block of poly(1,3-butadiene) having a low vinyl content. U.S. Pat. No. 4,168,286 proposes tetrablock polymers having the configuration B-$A_1$-C-$A_2$ and C-$A_1$-B-$A_2$, wherein B is a low vinyl poly 1,3-butadiene block, $A_1$ and $A_2$ which can be the same or different are polymerized blocks of a monovinylarene monomer and C is a polymerized block of a conjugated diene.

Methods of pre-cure of green rubber compositions before vulcanization using some irradiators such as an electron irradiator are described in U.S. Pat. No. 3,933,553; U.S. Pat. No. 3,933,566; U.S. Pat. No. 4,166,883; U.S. Pat. No. 4,221,253; and U.S. Patent Disclosure Document T951,005.

As mentioned above, there are many methods to improve the green properties of rubber compositions. However, the methods using irradiators need a large plant and equipment investment. A method employing ionogene functional groups or tertiary amines in the main chain of rubbery diene polymers or copolymers cannot be applied to natural rubber. Methods increasing the crystallinity of polymers or methods providing block copolymers deteriorate the physical properties of vulcanized rubber compositions.

Pneumatic tires generate heat internally during running. Intense heat results in heat separation of the belt or carcass portion of the tires. High hysteresis loss usually increases the rolling resistance of pneumatic tires. Recently, pneumatic tires which decrease fuel consumption of vehicles have been required from the standpoint of natural resource conservation and energy saving.

It is known to decrease the amount of carbon black or to change the type of carbon black in rubber compositions to obtain low hysteresis loss in rubber compositions. However, this method results in not only low green tensile strength but also deteriorated physical properties of vulcanized rubber compositions, especially low cut growth property. Therefore, delays in improving both green properties such as green tensile strength and green modulus and physical properties after vulcanization such as hysteresis loss and cut growth have occurred.

Rubber products which are used under severe conditions, such as tires, usually include a number of different components. The physical property requirement of each component are usually different. Accordingly, most of the components are made of different rubber compositions.

In rubber products having a plurality of components, rubber composition flow between the adjacent components in the vulcanization process sometimes prevents accurate arrangement of the rubber products and the reinforcing components according to the desired design. Especially, during tire vulcanization, an innerlinear rubber component receives a tensile force resulting from an increase in additional inner pressure caused by expansion of a bladder. Further, this component is simultaneously pressed against carcass components made of a ply coating rubber composition and ply cords and is pressed into the ply coating rubber composition between the ply cords. This phenomenon sometimes separates the ply coating rubber composition from the ply cords and decreases the effective thickness of the innerliner rubber component as an air barrier. In the extreme case, the ply cords are exposed on the innerliner rubber component, and this results in ply separation or tube puncture and a bad appearance of the inner surface of the tires.

Many methods are proposed to protect the innerliner rubber component from being pressed into a ply coating rubber composition between the ply cords during vulcanization.

U.S. Pat. No. 3,933,553; U.S. Pat. No. 3,933,566; U.S. Pat. No. 4,166,883; U.S. Pat. No. 4,221,253; and U.S. Patent Disclosure Document T951,005 described above teach a method where an innerliner rubber component after sheeting with a calender is pre-cured with an irradiator such as an electron irradiator before the tire building and vulcanization process.

The methods described above, which are to improve green properties such as green modulus and green tensile strength, have an effect of protecting an innerliner rubber component from rubber flow to a ply coating rubber composition during vulcanization.

Japanese Patent Publication No. 16,061/1980 discloses that a rubber composition comprising natural rubber, butadiene rubber and a dinitroso compound such as poly-p-dinitrosobenzene and bisnitroso-4-phenyl-1,4-piperadine, which is employed in an innerliner rubber composition or a ply coating rubber composition, affects the rubber flow of the innerliner rubber composition into the ply coating rubber composition during vulcanization.

Japanese Patent Publication No. 16,062/1980 teaches that a rubber composition, which comprises natural rubber or a blend rubber of natural rubber and a butadiene rubber and a dioxime compound such as p-benzoquinone-dioxime and p,p'-dibenzoquinone-dioxime, is employed in one of an innerliner rubber composition or a ply coating rubber composition and a rubber composition, which comprises natural rubber or a blend rubber of natural rubber and a butadiene rubber and an oxidizing agent such as chloranil, lead dioxide and peroxide compounds, is employed in the other of an innerlinear rubber composition or a ply coating rubber composition. In the induction period of vulcanization, the dioxime compound and the oxidizing agent migrate to the boundary between the innerliner rubber composition and the ply coating rubber composition, react with each other and form a dinitroso compound. This dinitroso compound acts as a vulcanizer and fixes the boundary.

SUMMARY OF THE INVENTION

An object of this invention is to achieve improved green properties, such as high green tensile strength and high green modulus.

Another object of this invention is to achieve improved hysteresis loss and cut growth property of a vulcanized rubber composition.

A further object is to protect adjacent rubber components from rubber flow during vulcanization.

This invention provides a novel rubber composition which comprises 100 parts by weight of a rubber selected from the group consisting of natural rubber and a synthetic diene rubber, about 20 to about 100 parts by weight of a reinforcing filler, about 0.1 to about 3.0 parts by weight of a nitroso compound having the formula (I)

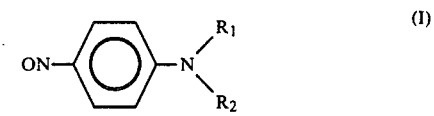

wherein $R_1$ and $R_2$, which may be the same or different, are selected from the group consisting of a hydrogen atom, an alkyl group having from 1 to 6 carbon atoms, a hydroxyalkyl group having from 1 to 6 carbon atoms, a cycloalkyl group and an aryl group and about 0.1 to about 3.0 parts by weight of a halogenated organic compound having the formula (II)

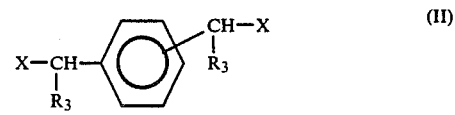

wherein $R_3$ is selected from the group consisting of a hydrogen atom, a methyl group, a chlorine atom and a bromine atom and X is a chlorine atom or a bromine atom.

In this invention, a nitroso compound and a halogenated organic compound are incorporated in the rubber composition and react with each other at room temperature (about 20°–30° C.) and form ionic bonds.

It has been found that one of the nitroso compounds incorporated in one of the adjacent rubber components reacts with one of the halogenated organic compounds incorporated in the other of the adjacent rubber components and forms effective ionic bonds in the boundary thereof to protect them from rubber flow during vulcanization.

This invention also concerns a novel method of protecting adjacent rubber components of a rubber product from rubber flow during vulcanization, which comprises incorporating about 0.1 to about 3.0 parts by weight of a nitroso compound having the formula (I)

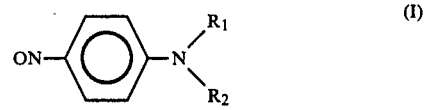

wherein $R_1$ and $R_2$, which may be the same or different, are selected from the group consisting of a hydrogen atom, an alkyl group having from 1 to 6 carbon atoms, a hydroxyalkyl group having from 1 to 6 carbon atoms, a cycloalkyl group and an aryl group, based on 100 parts by weight of a rubber selected from the group consisting of natural rubber and a synthetic diene rubber in one of the adjacent rubber components, incorporating about 0.2 to about 6.0 parts by weight of a halogenated organic compound having the formula (II)

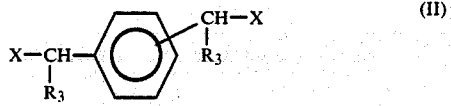 (II)

wherein $R_3$ is selected from the group consisting of a hydrogen atom, a methyl group, a chlorine atom and a bromine atom and X is chlorine atom or bromine atom, based on 100 parts by weight of a rubber selected from the group consisting of natural rubber and a synthetic diene rubber in the other of the adjacent rubber components, thereafter sticking the adjacent rubber components together, building the rubber product and vulcanizing the rubber product under pressure. (This method herein described will be designated a "migration method" for simplicity of discussion hereinafter.)

Suitable examples of $R_1$ and $R_2$ are cycloalkyl groups having from 3 to 6 carbon atoms and aryl groups having from 6 to 10 carbon atoms.

BRIEF DESCRIPTION OF THE DRAWING

The FIGURE is a partial cross-sectional inside view of the shoulder portion of a test tire.

DETAILED DESCRIPTION OF THE INVENTION

In this invention, suitable synthetic diene rubbers which can be used include synthetic polyisoprene rubber, polybutadiene rubber, styrenebutadiene rubber (5 to 45 wt% of styrene, 55 to 95 wt% of butadiene), ethylene-propylene-diene terpolymer rubber (20 to 75 wt% ethylene, 25 to 80 wt% propylene, 1 to 30 wt% of a diene rubber such as ethylidenenorbornene, methylenenorbornene, dicyclopentadiene and 1.4-hexadiene), isobutylene-isoprene rubber (95 to 99.5 wt% isobutylene and 0.5 to 5 wt% isoprene), halogenated (brominated or chlorinated) isobutylene-isoprene rubber (95 to 99.5 wt% isobutylene and 0.5 to 5 wt% isoprene) and a blend thereof. Suitable reinforcing filler include carbon black, silica and a blend thereof. It is preferred to incorporate about 20 to about 100 parts by weight of a reinforcing filler in the rubber composition of this invention. When the reinforcing filler is present in an amount of less than about 20 parts by weight, effective reinforcement of the rubber composition is not achieved. When it is present in an amount of more than 100 parts by weight, the vulcanized rubber composition has a high hysteresis loss. When the carbon black is HAF (High Abrasion Furnace Black), FEF (Fast Extrusion Furnace Black), GPF (General Purpose Furnace Black), HMF (High Modulus Furnace Black), SRF (Semi-Reinforcing Furnace Black) or a blend thereof, a better effect is obtained in improving the green properties of the rubber composition.

The nitroso compound and the halogenated organic compound of this invention can be incorporated in the rubber composition at the same time. It is preferred to incorporate the nitroso compound initially so that it reacts with the rubber and thereafter to incorporate the halogenated organic compound to form ionic bonds, a kind of pseudo-crosslinking, because better green tensile strength and green modulus can be obtained. The pseudo-crosslinking improves the dispersion of carbon black because it increases the viscosity of the rubber composition and accordingly improves the mixing effect.

When carbon black and the nitroso compound are incorporated in the rubber composition of this invention, the dispersion of the carbon black is improved, because the nitroso compound interacts to some extent with the carbon black and the carbon gel which is formed around the carbon black. Accordingly, hysteresis loss of the rubber composition is improved.

Examples of suitable nitroso compounds which can be used are N,N-dimethyl-p-nitrosoaniline (DMNA), N,N-diethyl-p-nitrosoaniline (DENA), N-phenyl-p-nitrosoaniline (PNA), N,N-dibutyl-p-nitrosoaniline (DBNA), N-methyl-N-hexyl-p-nitrosoaniline, N,N-di-2-hydroxyethyl-p-nitrosoaniline N-ethyl-N-2-hydroxyethyl-p-nitrosoaniline (EHNA), N-methyl-p-nitrosoaniline (MNA), N-n-hexyl-p-nitrosoaniline (HNA), N-cyclohexyl-p-nitrosoaniline (CHNA) and blends thereof. These nitroso compounds are commercially available and can be obtained by known synthetic methods such as the method described in J. Willenz, *Journal of Chemical Society*, 1955, page 1677.

It is necessary to incorporate from about 0.1 to about 3.0 parts by weight of the nitroso compound. When the nitroso compound is present in an amount of less than about 0.1 parts by weight, improved green tensile strength and green modulus cannot be obtained. When it is present in an amount of more than about 3.0 parts by weight, no increase in effect due to the nitroso compound is obtained and moreover the physical properties of the vulcanized rubber composition obtained are adversely affected.

Examples of suitable halogenated organic compounds which can be used are $\alpha,\alpha'$-dibromo-p-xylene (BPX), $\alpha,\alpha'$-dibromo-m-xylene (BMX), $\alpha,\alpha'$-dibromo-o-xylene (BOX), $\alpha,\alpha'$-dibromo-p-diethylbenzene (BPEB), $\alpha,\alpha,\alpha',\alpha'$-tetrabromo-p-xylene (TBPX), $\alpha,\alpha,\alpha',\alpha'$-tetrabromo-m-xylene (TBMX), $\alpha,\alpha,\alpha',\alpha'$-tetrabromo-o-xylene (TBOX), $\alpha,\alpha'$-dichloro-p-xylene (CPX), $\alpha,\alpha'$-dichloro-m-xylene (CMX), $\alpha,\alpha'$-dichloro-o-xylene (COX), and blends thereof. These halogenated organic compounds are commercially available.

It is necessary to incorporated from about 0.1 to about 3.0 parts by weight of a halogenated organic compound in the rubber composition of this invention. When the halogenated organic compound is present in an amount of less than about 0.1 parts by weight, improved green tensile strength and green modulus cannot be obtained. When it is present in an amount of more than about 3.0 parts by weight, the effect of the halogenated organic compound is not further increased and moreover the physical properties of the vulcanized rubber composition are adversely affected.

When the nitroso compound is incorporated in one of the adjacent rubber components of a rubber product and the halogenated organic compound is incorporated in the other of the adjacent rubber components, e.g., in the migration method, it is necessary to incorporate from about 0.2 to about 6.0 parts by weight of the halogenated organic compound because the halogenated organic compound must migrate to the adjacent rubber component. When the halogenated organic compound is present in an amount of less than about 0.2 parts by weight, the improved effect of protecting the adjacent rubber components from rubber flow during vulcanization cannot be obtained.

When it is present in an amount of more than about 6.0 parts by weight, the increase in effect is not obtained and the tackiness of the rubber composition is decreased because the halogenated organic compound blooms to a high degree.

The migration method of this invention is useful for protecting an innerliner rubber component of a tire from rubber flow into a ply coating rubber component of the tire, as described in the examples that follow. However, the scope of this invention is not limited to those examples. The method is also useful for protection against rubber flow between a tread component and a carcass component of a tire, between sidewall components of a tire, between layers of a rubber hose having a plurality of layers, between the components of a rubber damper and so on. In these cases, the recipes of two adajcent rubber components do not need to be the same. The migration method can be applied where three or more unvulcanized rubber components are put in layers.

The rubber compositions of this invention may also contain vulcanizing agents such as sulfur, sulfur chloride, alkylphenoldisulfides, 4,4'-dithio-bis-dimorpholine, alkylphenolformaldehyde resins and peroxides, accelerating agents such as dibenzothiazyl-disulfide, N,N'-dicyclohexyl-2-benzothiazolylsulfenamide, N-oxydiethylene-2-benzothiazole sulfenamide, mercaptobenzothiazole, N-cyclohexyl-2-benzothiazylsulfenamide, tetramethylthiuramidisulfide, tetramethylthiuram-monosulfide and diphenylguanidine, activators such as stearic acid, oleic acid and zinc oxide, antioxidants such as polymerized 2,2,4-trimethyl-1,2-dihydroquinoline, N,N'-diphenyl-p-phenylene-diamine, N-1,3-dimethylbutyl-N'-phenyl-p-phenylenediamine, N-phenyl-N'-isopropyl-p-phenylenediamine, 2-mercaptobenzoimidazole 2-mercaptomethylbenzoimidazole, 2,5-di-tert-butylhydroquinone and 2,6-di-tert-butyl-p-cresol, softeners such as aromatic process oils, naphthenic process oils, parafinic process oils, dibutylphthalate, dioctylphthalate, dioctyladipate dioctylsebacate and rubber substitutes, tackifiers such as coumaroneindene resins, phenol-terpene resins, phenol-formaldehyde resins, rosins, modified rosin resins and petroleum resins and the like, as desired.

The following examples are given for the purpose of further illustration of this invention. They are not to be construed, however, as limiting the scope of this invention. Unless otherwise indicated herein, all parts, percents, ratios and the like are by weight.

PREPARATION EXAMPLE 1

Synthesis of N,N-Dibutyl-p-nitrosoaniline (DBNA)

A solution was prepared by dissolving 18.5 g (0.26 mol) of sodium nitrite, of a purity of 97%, in 30 ml of water. This solution was added dropwise to a solution composed of 51.3 g (0.25 mol) of N,N-dibutylaniline, 200 g of water and 105 ml of conc HCl (35 to 38%) at a temperature between 10° and 20° C. for one-half hour. After stirring the solution obtained for one hour, the solution was neutralized to pH 8 with a 15% aqueous solution of sodium hydroxide. The crystals obtained were filtered, washed sufficiently on filter paper and thereafter dried with hot-air at 50° C. for 48 hours. 28.1 g of N,N-dibutyl-p-nitrosoaniline with a melting point of 122°~124° C. was obtained. The yield was 48.0%.

PREPARATION EXAMPLE 2

Synthesis of N-Ethyl-N-2-hydroxyethyl-p-nitrosoaniline (EHNA)

A solution was prepared by dissolving 18.5 g (0.26 mol) of sodium nitrite, of a purity of 97%, in 30 ml of water. This solution was added dropwise to a solution composed of 41.3 g (0.25 mol) of N-ethyl-N-2-hydroxyethylaniline, 200 g of water and 105 ml of conc HCl with stirring at a temperature between 5° and 10° C. for one-half hour. After stirring the solution obtained at a temperature between 10° and 20° C. for one hour, the solution was neutralized to pH 8 with a 15% aqueous solution of sodium hydroxide. 100 ml of benzene was added to the neutralized solution with stirring. After standing, the organic phase of the solution was separated. The benzene of the organic phase obtained was removed under reduced pressure. 28.9 g of N-ethyl-N-2-hydroxyethyl-p-nitrosoaniline which is a dark brown colored viscous liquid was obtained. The yield was 59.6%.

PREPARATION EXAMPLE 3

Synthesis of N-Methyl-p-nitrosoaniline (MNA)

Initially, 107 g (1.0 mol) of N-methylaniline was added dropwise to a methyl alcohol solution containing 40% HCl with stirring at a temperature between 5° and 10° C. for one and a half hours. Thereafter, 80 g (1.12 mol) of sodium nitrite, of a purity of 97%, was added to the solution obtained at 5° C. After stirring at a temperature between 15° and 25° C. for 15 hours, the solution was poured in 2 l of ice water and the water solution was neutralized to pH 8 with aqueous ammonia after stirring for 15 minutes. Thereafter, 500 ml of heptane was added to the solution. After stirring at a temperature between 10° and 20° C. for 2 hours, the crystals obtained were filtered, washed sufficiently on the filter paper and thereafter dried with hot-air at 50° C. for 48 hours. 69.5 g of N-methyl-p-nitrosoaniline of a melting point of 115°~117° C. was obtained. The yield was 51.1%.

PREPARATION EXAMPLE 4

Synthesis of N-n-Hexyl-p-nitrosoaniline (HNA)

N-n-hexyl-p-nitrosoaniline (99.5 g) of a melting point of 46°~48° C. was prepared in the same manner as in Preparation Example 3, except that 107 g (1.0 mol) of N-methylaniline was changed to 177 g (1.0 mol) of N-n-hexylaniline. The yield was 48.3%.

PREPARATION EXAMPLE 5

Synthesis of N-Cyclohexyl-p-nitrosoaniline (CHNA)

N-cyclohexyl-p-nitrosoaniline (84.1 g) of a melting point of 90°~92° C. was prepared in the same manner as in Preparation Example 3, except that 107 g (1.0 mol) of N-methylaniline was changed to 175 g (1.0 mol) of N-cyclohexylaniline. The yield was 41.2%.

EXAMPLES 1 TO 13, COMPARATIVE EXAMPLES 1 TO 7

Thirteen kinds of rubber compositions were prepared as examples of this invention by kneading 80 parts by weight of natural rubber (NR), 20 parts by weight of synthetic polyisoprene rubber (IR), 50 parts by weight of HAF carbon black, 2 parts by weight of stearic acid, 0.6 parts by weight of N-1,3-dimethylbutyl-N'-phenylp-phenylenediamine and 0.9 parts by weight of a nitrosoaniline as shown in Table 1 below using a Banbury mixer for 4 minutes, thereafter cooling the rubber compositions and then kneading again each rubber composition, 6 parts by weight of zinc oxide, 0.5 parts by weight of N-oxydiethylene-2-benzothiazole sulfenamide, 5 parts by weight of sulfur and 0.6 parts by weight of a halogenated organic compound as shown in Table 1 below.

Seven kinds of rubber compositions were prepared as comparative examples. Comparative Example 1 contained no nitroso compound and halogenated organic compound. In Comparative Example 2, the NR was replaced by IR. Comparative Example 3 contained 0.9 parts by weight of DMNA but no halogenated organic compound. Comparative Example 4 contained 0.6 parts by weight of BPX but no nitroso compound. In Comparative Example 5, NR and IR were replaced by DM-IR which is a type of synthetic polyisoprene rubber having dimethylamine group in the molecular chain, as described in above-mentioned Japanese Patent Publication Nos. 41,281/1983 and 41,282/1983. DMNA, DENA, PNA, BPX, BMX, BOX, TBPX, BPEB and CPX as commercial products manufactured by Tokyo Industry Co., Ltd. were used.

In Comparative Example 6, 0.6 parts by weight of nitrosoaniline was changed for 0.1 parts by weight of poly-p-dinitrosobenzene (Poly-PDNB) and no halogenated organic compound was incorporated. In Comparative Example 7, 0.6 parts by weight of nitrosoaniline was changed for 0.1 parts by weight of p-benzoquinonedioxime (PBQ) and 0.6 parts by weight of halogenated organic compound was changed for 0.2 parts by weight of chloranil.

The green tensile strength (Tb) at 25° C. and 80° C., the green modulus at 100% elongation ($M_{100}$) and the green ultimate elongation (Eb) according to J1S-K-6301 of these twenty kinds of unvulcanized rubber composition were evaluated.

After vulcanization at 145° C. for 30 minutes, the rebound resilience, and the cut growth test according to J1S-K-6301 of the rubber compositions were also evaluated. The original cut length was 1 mm and the fatigue frequency was 1,000 times in the cut growth test. The cut growth test was estimated as an index of cut length using Comparative Example 1 as a control. The smaller the index value, the better the cut growth property. The results obtained are shown in Table 1 below.

TABLE 1

| Rubber | | Comparative Examples | | Examples | | | | | | | |
|---|---|---|---|---|---|---|---|---|---|---|---|
| | | 1 NR/IR | 2 IR | 1 NR/IR | 2 NR/IR | 3 NR/IR | 4 NR/IR | 5 NR/IR | 6 NR/IR | 7 NR/IR | 8 NR/IR |
| Nitroso Compound | | — | — | DMNA | DENA | DBNA | MNA | HNA | PNA | OHNA | DMNA |
| Halogenated Organic Compound | | — | — | BPX | BPX | BPX | BPX | BPX | BPX | BPX | BMX |
| Green Properties at 25° C. | $T_b$ (kg/cm$^2$) | 8.4 | 2.2 | 66.0 | 63.2 | 58.2 | 67.1 | 66.3 | 51.3 | 50.5 | 59.2 |
| | $E_b$ (%) | 602 | 1080 | 481 | 458 | 479 | 428 | 436 | 474 | 478 | 471 |
| | $M_{100}$ (kg/cm$^2$) | 2.7 | 2.0 | 5.9 | 5.7 | 5.7 | 6.0 | 5.8 | 4.8 | 4.7 | 5.1 |
| Green Properties at 80° C. | $T_b$ (kg/cm$^2$) | 0.56 | 0.39 | 11.3 | 10.9 | 10.3 | 11.8 | 11.3 | 8.4 | 8.2 | 9.6 |
| | $E_b$ (%) | 368 | 298 | 598 | 634 | 672 | 595 | 601 | 645 | 651 | 655 |
| | $M_{100}$ (kg/cm$^2$) | 0.88 | 0.54 | 2.1 | 2.0 | 1.9 | 2.2 | 2.1 | 1.7 | 1.6 | 1.9 |
| Rebound Resilience (%) | | 61 | 60 | 71 | 70 | 70 | 71 | 71 | 68 | 68 | 71 |
| Cut Growth Test | | 100 | 180 | 75 | 75 | 80 | 75 | 75 | 85 | 85 | 80 |

| Rubber | | Examples | | | | | Comparative Examples | | | | |
|---|---|---|---|---|---|---|---|---|---|---|---|
| | | 9 NR/IR | 10 NR/IR | 11 NR/IR | 12 NR/IR | 13 NR/IR | 3 NR/IR | 4 NR/IR | 5 DMIR | 6 NR/IR | 7 NR/IR |
| Nitroso Compound | | DMNA | DMNA | DMNA | DMNA | EHNA | DMNA | — | — | Poly-PDNB | PBQ |
| Halogenated Organic Compound | | BOX | TBPX | BPEB | OPX | BPX | — | BPX | BPX | — | Chloranil |
| Green Properties at 25° C. | $T_b$ (kg/cm$^2$) | 60.3 | 51.5 | 55.3 | 51.9 | 50.1 | 9.9 | 8.1 | 43.3 | 19.2 | 18.4 |
| | $E_b$ (%) | 463 | 478 | 473 | 480 | 487 | 584 | 633 | 536 | 595 | 598 |
| | $M_{100}$ (kg/cm$^2$) | 5.3 | 4.7 | 5.0 | 4.6 | 4.5 | 8.0 | 2.5 | 4.9 | 3.2 | 3.0 |
| Green Properties at 80° C. | $T_b$ (kg/cm$^2$) | 9.9 | 8.5 | 9.1 | 8.4 | 8.1 | 0.61 | 0.49 | 6.1 | 2.9 | 2.8 |
| | $E_b$ (%) | 643 | 648 | 651 | 650 | 665 | 413 | 430 | 438 | 631 | 625 |
| | $M_{100}$ (kg/cm$^2$) | 2.0 | 1.7 | 1.8 | 1.7 | 1.5 | 0.97 | 0.87 | 1.8 | 1.4 | 1.2 |
| Rebound Resilience (%) | | 70 | 68 | 69 | 69 | 68 | 70 | 59 | 58 | 59 | 59 |
| Cut Growth Test | | 80 | 90 | 85 | 90 | 95 | 110 | 105 | 115 | 115 | 117 |

The results in Table 1 above show that the rubber compositions of this invention provide not only improved green properties, which are green tensile strength, green modulus and green ultimate elongation, but also improved physical properties after vulcanization, which are low hysteresis loss (=high rebound resilience) and low cut growth.

TIRE EXAMPLES 1 TO 14,

Tire Comparative Examples 1 to 4

Eighteen kinds of radial tires (size: 1000R20, 14PR) for trucks and buses were produced. These tires have a tread portion and sidewall portions which are made of rubber compositions composed of conventional formulations, and a belt and carcass which were reinforced with steel cords (belt ply cords and carcass ply cords 1).

The FIGURE shows the arrangement of the shoulder internal portion of the radial tires. Carcass ply cords 1 were surrounded with carcass ply coating gum 2. The amount in use of the carcass ply cords was 28/50 mm. Innerliner gum 3 consists of inner layer 3A and outer layer 3B. Inner layer 3A and outer layer 3B were 2 mm thick, respectively. The formulation of the carcass ply coating gum 2 is shown in Table 2 below. The formulations of inner layer 3A and outer layer 3B are shown in Table 3 below.

TABLE 2

| | |
|---|---|
| Natural Rubber | 90 parts by weight |
| IR 2200 | 10 parts by weight |
| HAF Carbon Black | 50 parts by weight |
| N—1,3-Dimethylbutyl-N'—phenyl-p-phenylenediamine | 1 part by weight |
| Aromatic Oil | 2 parts by weight |
| Zinc Oxide | 8 parts by weight |
| N—Oxydiethylene-2-benzothiazolesulfenamide | 0.5 part by weight |
| Sulfur | 5 parts by weight |
| Cobalt Naphthenate | 3 parts by weight |

TABLE 3

| | Inner Layer 3A | Outer Layer 3B |
|---|---|---|
| Natural Rubber | 90 parts by weight | 90 parts by weight |
| IR 2200 | 10 parts by weight | 10 parts by weight |
| HAF Carbon Black | 50 parts by weight | 50 parts by weight |
| N—1,3-Dimethyl-N'—phenyl-p-phenylenediamine | 1 part by weight | 1 part by weight |
| Aromatic Oil | 2 parts by weight | 2 parts by weight |
| Zinc Oxide | 8 parts by weight | 8 parts by weight |
| N—Oxydiethylene-2-benzothiazolesulfenamide | 0.5 part by weight | 0.5 part by weight |
| Sulfur | 5 parts by weight | 5 parts by weight |
| Cobalt Naphthenate | 3 parts by weight | 3 parts by weight |
| Nitroso Compound | 0.9 part by weight | — |
| Halogenated Organic Compound | — | 2.2 parts by weight | zoquinonedioxime (PBQ). In the outer layer 3B of Tire Comparative Example 4, 2.2 parts by weight of a halogenated organic compound was changed for 0.2 parts by weight of Chloranil.

Eighteen kinds of radial tires were evaluated as to sheeting processability, green properties and innerliner gum gauge L as shown in the FIGURE.

Sheeting processability was estimated through examination of warming up time and sheet surface. "Very good", "good" and "bad" are indicated by the symbols , , and , respectively.

Each set of inner layer 3A and outer layer 3B were

The inner layer 3A of Tire Example 14 contained not only 0.9 parts by weight of DMNA but also 2.2 parts by weight of BPX. The outer layer 3B of Tire Example 14 contained no halogenated organic compound. The inner layer 3A and the outer layer 3B of Tire Comparative Example 1 contained neither nitroso compound nor halogenated organic compound. The outer layer 3B of Tire Comparative Example 2 contained no halogenated organic compound. The inner layer 3A of Tire Comparative Example 3 contained no halogenated organic compound. In the inner layer 3A of Tire Comparative Example 4, 0.9 parts by weight of a nitroso compound was changed for 0.1 parts by weight of p-benadhered together hot just after sheeting so that the halogenated organic compound could migrate to inner layer 3A. After cooling, the green tensile strength (Tb), the green ultimate elongation (Eb) and the green modulus at 100% elongation ($M_{100}$) were determined at 25° C. and 80° C. according to J1S-K-6301. Innerliner gum gauge L was measured at 4 points in the tire with a non-destructive coating thickness tester Dermitron D-9 made by Unit Process Assemblies Inc. The average value x and the standard deviation $\sqrt{v}$ of each test tire were determined.

The results obtained are shown in Table 4 below.

TABLE 4

| | | Tire Examples | | | | | | | | |
|---|---|---|---|---|---|---|---|---|---|---|
| | | 1 | 2 | 3 | 4 | 5 | 6 | 7 | 8 | 9 |
| Inner Layer 3A | | DMNA | DENA | DBNA | MNA | HNA | PNA | OHNA | DMNA | DMNA |
| Outer Layer 3B | | BPX | BPX | BPX | BPX | BPX | BPX | BPX | BMX | BOX |
| Green Properties at 25° C. | $T_b$ (kg/cm$^2$) | 72.8 | 66.8 | 61.2 | 70.4 | 69.3 | 54.6 | 53.1 | 61.4 | 62.8 |
| | $E_b$ (%) | 402 | 415 | 444 | 401 | 404 | 442 | 446 | 436 | 430 |
| | $M_{100}$ (kg/cm$^2$) | 7.5 | 7.2 | 7.2 | 7.5 | 7.3 | 6.1 | 6.4 | 7.1 | 6.9 |
| Green Properties at 80° C. | $T_b$ (kg/cm$^2$) | 18.9 | 16.2 | 15.8 | 16.8 | 16.5 | 12.4 | 12.6 | 15.5 | 15.2 |
| | $E_b$ (%) | 395 | 392 | 432 | 356 | 361 | 405 | 411 | 413 | 402 |
| | $M_{100}$ (kg/cm$^2$) | 3.74 | 3.43 | 3.31 | 3.65 | 3.34 | 2.94 | 2.84 | 3.32 | 3.42 |
| Innerliner Gum Gauge L | $\bar{x}$ | 1.28 | 1.27 | 1.27 | 1.21 | 1.25 | 1.20 | 1.23 | 1.25 | 1.27 |
| | $\sqrt{v}$ | 0.03 | 0.02 | 0.03 | 0.03 | 0.02 | 0.05 | 0.04 | 0.03 | 0.04 |
| Sheeting Processability | Inner Layer 3A | | | | | | | | | |
| | Outer Layer 3B | | | | | | | | | |

| | | Tire Examples | | | | | Tire Comparative Examples | | | |
|---|---|---|---|---|---|---|---|---|---|---|
| | | 10 | 11 | 12 | 13 | 14 | 1 | 2 | 3 | 4 |
| Inner Layer 3A | | DMNA | DMNA | DMNA | EHNA | DMNA BPX | — | DMNA | — | PBQ (0.1 part) |
| Outer Layer 3B | | TBPX | BPEB | OPX | BPX | — | — | — | BPX | Chloranil (0.2 part) |
| Green Properties at 25° C. | $T_b$ (kg/cm$^2$) | 53.8 | 58.3 | 54.9 | 52.9 | 75.3 | 8.7 | 9.7 | 8.5 | 18.8 |
| | $E_b$ (%) | 443 | 438 | 448 | 451 | 386 | 624 | 613 | 621 | 597 |
| | $M_{100}$ (kg/cm$^2$) | 6.5 | 7.0 | 6.2 | 6.1 | 7.9 | 2.6 | 2.8 | 2.5 | 3.1 |
| Green Properties at 80° C. | $T_b$ (kg/cm$^2$) | 15.1 | 15.6 | 14.2 | 15.5 | 19.8 | 0.66 | 0.68 | 0.63 | 2.9 |
| | $E_b$ (%) | 409 | 410 | 408 | 423 | 362 | 384 | 399 | 402 | 628 |
| | $M_{100}$ (kg/cm$^2$) | 3.11 | 3.25 | 3.18 | 2.93 | 3.91 | 0.85 | 0.93 | 0.83 | 1.3 |
| Innerliner Gum Gauge L | $\bar{x}$ | 1.26 | 1.20 | 1.21 | 1.23 | 1.26 | 0.56 | 0.71 | 0.52 | 0.93 |
| | $\sqrt{v}$ | 0.02 | 0.02 | 0.03 | 0.03 | 0.02 | 0.13 | 0.11 | 0.16 | 0.18 |

| Sheeting | Inner Layer 3A | × |
| Processability | Outer Layer 3B | |

Tire Examples 1 to 14 exhibit improved green properties, large innerliner gum gauges L and small standard deviation.

In addition, the sheeting processabilities of Tire Examples 1 to 13 are much better than that of Tire Example 14.

Where sheeting processability is very important for factory productivity, the migration method of this invention has the marked advantage of protecting adjacent rubber components of a rubber product from rubber flow during vulcanization.

While the invention has been described in detail and with reference to specific embodiments thereof, it will be apparent to one skilled in the art that various changes and modifications can be made therein without departing from the spirit and scope thereof.

What is claimed is:

1. A rubber composition comprising:
   100 parts by weight of a rubber selected from the group consisting of natural rubber and a synthetic diene rubber, wherein the synthetic diene rubber is at least one rubber selected from the group consisting of synthetic polyisoprene rubber, polybutadiene rubber, styrene-butadiene rubber, an ethylene-propylene-diene terpolymer, isobutylene-isoprene copolymer and a halogenated isobutylene-isoprene copolymer,
   about 20 to about 100 parts by weight of a reinforcing filler selected from the group consisting of carbon black, silica and a blend thereof,
   about 0.1 to about 3.0 parts by weight of a nitroso compound having the formula (I)

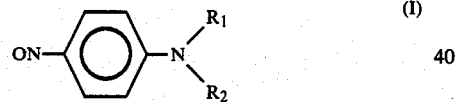

wherein $R_1$ and $R_2$, which may be the same or different, are selected from the group consisting of a hydrogen atom, an alkyl group having from 1 to 6 carbon atoms, a hydroxyalkyl group having from 1 to 6 carbon atoms, a cycloalkyl group and an aryl group, and
   about 0.1 to about 3.0 parts by weight of an halogenated organic compound having the formula (II)

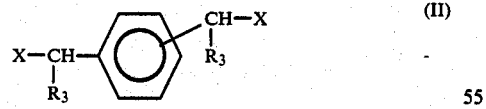

wherein $R_3$ is selected from the group consisting of a hydrogen atom, a methyl group, a chlorine atom and a bromine atom and X is a chlorine atom or a bromine atom.

2. The composition of claim 1, wherein the reinforcing filler is at least one filler selected from the group consisting of carbon black and silica.

3. The composition of claim 1, wherein the nitroso compound is at least one compound selected from the group consisting of N,N-dimethyl-p-nitrosoaniline, N,N-diethyl-p-nitrosoaniline, N-phenyl-p-nitrosoaniline, N,N-dibutyl-p-nitrosoaniline, N-methyl-N-hexyl-p-nitrosoaniline, N,N-di-2-hydroxyethyl-p-nitrosoaniline N-ethyl-N-2-hydroxyethyl-p-nitrosoaniline, N-methyl-p-nitrosoaniline, N-n-hexyl-p-nitrosoaniline, and N-cyclohexyl-p-nitrosoaniline.

4. The composition of claim 1, wherein the halogenated organic compound is at least one halogenated organic compound selected from the group consisting of α,α'-dibromo-p-xylene, α,α'-dibromo-m-xylene, α,α'-dibromo-o-xylene, α,α'-dibromo-p-diethylbenzene, α,α,α',α'-tetrabromo-p-xylene, α,α,α', α',-tetrabromo-m-xylene, α,α,α',α'-tetrabromo-o-xylene, α,α'-dichloro-p-xylene, α,α'-dichloro-m-xylene and α,α'-dichloro-o-xylene.

5. The composition of claim 1, wherein the cycloalkyl group has from 3 to 6 carbon atoms.

6. The composition of claim 1, wherein the aryl group has from 6 to 10 carbon atoms.

7. The composition of claim 2, wherein the carbon black is at least one selected from the group consisting of HAF, FEF, GPF, HMF and SRF carbon blacks.

8. A method of increasing the green tensile strength and the green modulus of a rubber composition comprising:
   100 parts by weight of a rubber selected from the group consisting of natural rubber and a synthetic diene rubber, wherein the synthetic diene rubber is at least one rubber selected from the group consisting of synthetic polyisoprene rubber, polybutadiene rubber, styrene-butadiene rubber, an ethylene-propylene-diene terpolymer, an isobutylene-isoprene copolymer and a halogenated isobutylene-isoprene copolymer and about 20 to about 100 parts by weight of a reinforcing filler selected from the group consisting of carbon black, silica and a blend thereof,
   which method comprises incorporating therewith about 0.1 to about 3.0 parts by weight of a nitroso compound having the formula (I)

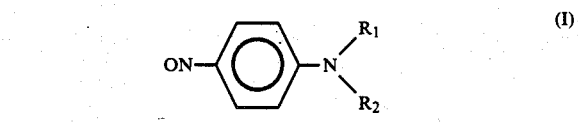

wherein $R_1$ and $R_2$, which may be the same or different, are selected from the group consisting of a hydrogen atom, an alkyl group having from 1 to 6 carbon atoms, a hydroxyalkyl group having from 1 to 6 carbon atoms, a cycloalkyl group and an aryl group, and
   about 0.1 to about 3.0 parts by weight of a halogenated organic compound having the formula (II)

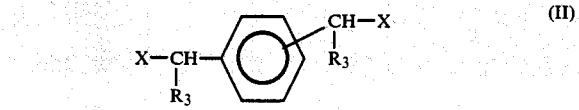

wherein $R_3$ is selected from the group consisting of a hydrogen atom, a methyl group, a chlorine atom and a bromine atom and X is a chlorine atom or a bromine atom.

9. The method of claim 8, wherein the nitroso compound is at least one compound selected from the group consisting of N,N-dimethyl-p-nitrosoaniline, N,N-diethyl-p-nitrosoaniline, N-phenyl-p-nitrosoaniline, N,N-dibutyl-p-nitrosoaniline, N-methyl-N-hexyl-p-nitrosoaniline, N,N-di-2-hydroxyethyl-p-nitrosoaniline N-ethyl-N-2-hydroxyethyl-p-nitrosoaniline, N-methyl-p-nitrosoaniline, N-n-hexyl-p-nitrosoaniline and N-cyclohexyl-p-nitrosoaniline.

10. The method of claim 9, wherein the halogenated organic compound is at least one halogenated organic compound selected from the group consisting of $\alpha,\alpha'$-dibromo-p-xylene, $\alpha,\alpha'$-dibromo-m-xylene, $\alpha,\alpha'$-dibromo-o-xylene, $\alpha,\alpha'$-dibromo-p-diethylbenzene, $\alpha,\alpha,\alpha',\alpha'$-tetrabromo-p-xylene, $\alpha,\alpha,\alpha',\alpha'$-tetrabromo-m-xylene, $\alpha,\alpha,\alpha',\alpha'$-tetrabromo-o-xylene, $\alpha,\alpha'$-dichloro-p-xylene, $\alpha,\alpha'$-dichloro-m-xylene and $\alpha,\alpha'$-dichloro-o-xylene.

11. The method of claim 8, wherein the cycloalkyl group has from 3 to 6 carbon atoms.

12. The method of claim 8, wherein the aryl group has from 6 to 10 carbon atoms.

13. The method of claim 8, wherein the reinforcing filler is at least one filler selected from the group consisting of carbon black and silica.

14. The method of claim 13, wherein the carbon black is at least one selected from the group consisting of HAF, FEF, GPF, HMF and SRF carbon black.

* * * * *